Sept. 9, 1958 W. F. MacGLASHAN, JR., ET AL 2,851,056
SOLENOID VALVE WITH PNEUMATIC LOCK
Filed Oct. 3, 1955
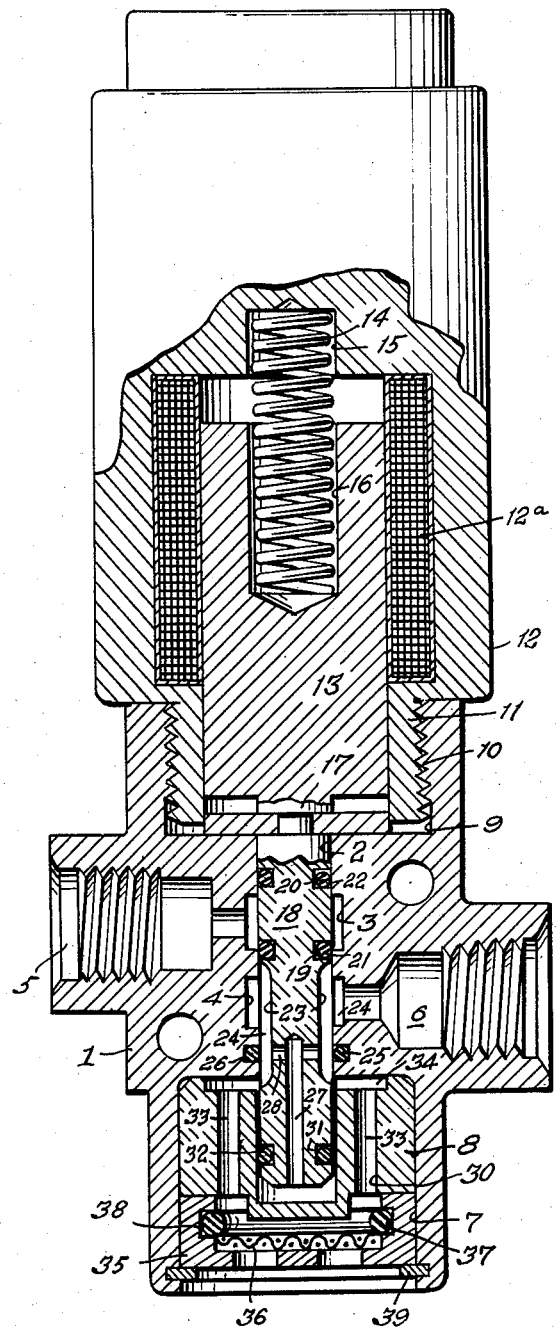
INVENTORS
William F. MacGlashan Jr.
BY Harry J. Margraf
Clyde R. Seitz
*W. E. Thibodeau + A. W. Dew*
ATTORNEYS

2,851,056
SOLENOID VALVE WITH PNEUMATIC LOCK

William F. MacGlashan, Jr., Pasadena, Harry J. Margraf, Altadena, and Clyde R. Seitz, Pasadena, Calif., assignors to the United States of America as represented by the Secretary of the Army Application October 3, 1955, Serial No. 538,295

4 Claims. (Cl. 137—464)

This invention relates to a solenoid valve with pneumatic lock and more particularly to a normally closed solenoid operated pneumatic line valve designed to vent downstream when closed.

It is the principal object of the invention to provide a solenoid operated valve having venting means located at one end of the valve housing opposite the solenoid and when the valve is open, the venting means will act to hold the valve in open position against the force of a return spring incorporated in the solenoid.

Other and further objects and advantages will appear from the following disclosure.

In the single figure of the accompanying drawing, illustrating a valve in longitudinal section and constructed in accordance with the invention, wherein similar reference characters refer to similar parts throughout, 1 indicates a cylindrical valve body having a longitudinal bore 2 therein, enlarged at axially-spaced points to form an annular inlet channel 3 and annular outlet channel 4. Channel 3 communicates with an inlet port 5 and channel 4 communicates with an outlet port 6. These ports are radially disposed with respect to the longitudinal axis of the valve body. The lower end of body 1, as the parts are viewed in the figure, is counterbored as at 7 to receive a pneumatic latching cylinder 8. The opposite end of the valve body is counterbored as at 9 and screw threaded as at 10 to receive a threaded boss 11 forming an integral part of a solenoid housing 12. Slidably mounted in solenoid housing 12 is an armature 13. The armature 13 is normally urged to its extended or lower position by a coil spring 14 seated in a coaxial bore 15 formed in the housing 12 and a bore 16 formed in the armature, but upon energization of solenoid or winding 12a is drawn upwardly against the urge of the spring. The armature 13 is mechanically connected as at 17 to one end of a valve spool or plunger 18 having a smooth sliding fit within bore 2. The spool is grooved as at 19 and 20 to receive O-ring seals 21 and 22 disposed at opposite sides of inlet channel 3 when the valve is in its closed position that is, the position shown on the drawing. In the region of the channel 4 and continuing to the counterbore 7 spool 18 is provided with a plurality of longitudinally extending grooves 23 forming therebetween a corresponding number of ribs 24 engaging an O-ring 25 set into an annular groove 26 formed in the valve body 1 between outlet channel 4 and the counterbore 7.

The spool or plunger 18 is provided with an elongated central passageway 27 formed in the free end thereof and communicates with radial passageways 28 to provide communication between the lower end of the spool 18 and the grooves 23. A pneumatic lock consisting of a cylinder 8 has a smooth fit within counterbore 7 and is provided with a centrally bored socket 30 to receive the lower extremity of spool 18 with a smooth fit. Adjacent its lower end, the spool 18 is provided with an annular groove 31 to receive an O-ring 32. The cylinder 8 is further provided with a series of bleeder ports 33 extending therethough and communicating with an annular chamber 34 formed by a shallow bore in the upper surface of the cylinder. The cylinder 8 is held in place by an annular frame 35 supporting a circular screen 36 which is retained in a frame 35, by an O-ring 37 nesting in a channel 38 formed in the inner wall of the frame 35. The frame is retained in counterbore 7 by a snap ring 39.

The operation of the valve is as follows: When the valve is in its closed position as shown in the drawing, the downstream side of the valve is vented to the atmosphere through the grooves 23, chamber 34 and bleed port 33. Upon operation of the armature 13, in response to energization of winding 12a, spool 18 is drawn upwardly and the axial grooves 23 bridge between the inlet channel 3 and outlet channel 4. Under this condition, the end of the spool extending into the socket 30 in cylinder 8 is exposed to the pressure of the line fluid acting through radial passageways 28 and bore 27, which acts to hold the spool in its open position against the force of the return spring 14. Should the line air pressure drop below a predetermined value, the valve spool 18 will be forced into its closed position by the spring 14 and air in socket 30 will then vent through bores 27 and 28, into chamber 34 and through ports 33 and to the atmosphere.

It is apparent from the foregoing that a highly efficient yet simple valve mechanism has been devised. The movable parts of the valve are at a minimum, and parts may be replaced quickly by a few operations. The valve is entirely automatic in operation and requires little or no attention.

It is to be understood that the form of the invention herewith shown and described is to be taken as a preferred example of the same, and that various changes in the shape, size and arrangement of parts may be resorted to without departing from the spirit of the invention, or the scope of the subjoined claims.

We claim:

1. In a valve, a valve body having a central axial bore with axially spaced, first and second enlargements, said bore terminating at one end in a counterbore, said body having inlet and outlet connections communicating with said first and second enlargements, respectively, a spool valve element having a centrally disposed axially grooved portion and slidably fitting said bore for movement from a first position wherein said grooved portion spans said enlargements, to a second position wherein said grooved portion is out of registry with one of said enlargements, a pneumatic lock for said spool valve element comprising a holding cylinder closed at one end and having atmospheric bleed passageways in its wall and is rigidly fixed within the counterbore of said body and receives the contiguous end of said spool with a smooth sliding fit, there being a passageway in said spool from said grooved portion to said contiguous end thereof said grooved portion on said spool valve element connecting said second enlargement and said bleed passageways when in said second position.

2. In a valve, a valve body having a central axial bore and inlet and outlet connections communicating respectively with first and second annular enlargements of said bore axially spaced therealong, a spool valve element having a grooved central portion and slidably fitting said bore for movement between first and second limiting positions, said grooved portion spanning and connecting said enlargements in first position only of said element pneumatic locking, means for said spool valve element rigidly connected with said body and forming a cylindrical chamber contiguous one end of said bore and coaxially thereof, said chamber being closed at its end remote from said element and having atmospheric bleed passageways in its wall, there being a passage in said element connecting said grooved central portion and the end of said element within said chamber said grooved central portion on said spool valve element connecting said second annular enlargement and said bleed passageways when in said second limiting position.

3. In a valve, a valve body having a central axial bore and inlet and outlet connections communicating respectively with first and second annular enlargements of said bore axially spaced therealong, a spool valve element having an axially grooved central portion and slidably fitting said bore for movement between first and second limiting positions said grooved portion spanning and connecting said enlargements in first position only of said element pneumatic locking, means for said spool valve element rigidly connected with said body and forming a cylindrical chamber contiguous one end of said bore and coaxially thereof, said cylindrical chamber being closed at one end and having atmospheric bleed passageways in its wall, said element having an end slidably fitting said chamber, there being a passageway in said element opening through the end thereof in said chamber and communicating with said centrally-grooved portion thereof, means connected with the end of said element remote from said chamber and operable to move said element to first position, and spring means normally urging said element into said second position whereby said axially grooved portion on said spool valve, when in said second position, will connect said second enlargement and said bleed passageways.

4. In a valve, a valve body having a central longitudinal bore and first and second counterbores at its respective ends, said bore having axially spaced first and second coaxial enlargements in communication with inlet and outlet ports respectively, a valve spool having an axially grooved central portion slidably fitting said bore for axial movement between a first limiting position wherein said valve is open, said grooved central portion of said spool spanning and interconnecting said enlargements, to a second limiting position, wherein said valve is closed and said grooved central portion is out of alignment with said first enlargement, spring means normally urging said valve spool to said second closed position, there being passageways in the contiguous end of said valve spool connecting said grooved portion and the end thereof, and pneumatic locking means normally holding said valve spool in its first position wherein said valve is open comprising a cylinder closed at one end, rigidly fixed in said second counterbore and receiving the contiguous end of said valve spool with a sliding fit, there being an annular chamber formed at the open end of said cylinder and a series of bores in the wall of said cylinder communicating between said annular chamber and the atmosphere said annular chamber being so spaced from said second enlargement that, when said valve spool is in said second limiting position, said grooved central portion connects said second enlargement and said annular chamber.

References Cited in the file of this patent

UNITED STATES PATENTS

| | | |
|---|---|---|
| 2,379,483 | Hapgood | July 3, 1945 |
| 2,656,144 | Frantz | Oct. 20, 1953 |
| 2,711,757 | Gardner | June 28, 1955 |

FOREIGN PATENTS

| | | |
|---|---|---|
| 497,843 | Great Britain | of 1938 |